United States Patent
Kliemannel

(10) Patent No.: US 6,761,081 B2
(45) Date of Patent: Jul. 13, 2004

(54) SHIFTING DEVICE FOR SHIFTING BETWEEN DIFFERENT OPERATING STATES OF A MOTOR VEHICLE TRANSMISSION

(75) Inventor: Wolfgang Kliemannel, Lemförde (DE)

(73) Assignee: ZF Lemförder Metallwaren AG, Stemwede-Dielingen (DE)

( * ) Notice: Subject to any disclaimer, the term of this patent is extended or adjusted under 35 U.S.C. 154(b) by 0 days.

(21) Appl. No.: 10/182,787
(22) PCT Filed: Jan. 22, 2002
(86) PCT No.: PCT/DE02/00189
§ 371 (c)(1), (2), (4) Date: Jul. 31, 2002
(87) PCT Pub. No.: WO02/057658
PCT Pub. Date: Jul. 25, 2002

(65) Prior Publication Data
US 2003/0047016 A1 Mar. 13, 2003

(30) Foreign Application Priority Data
Jan. 22, 2001 (DE) .......................... 101 02 843

(51) Int. Cl.$^7$ .............................................. F16H 59/00
(52) U.S. Cl. ...................................................... 74/335
(58) Field of Search ........................ 74/471 XY, 473.1, 74/473.12, 335; 341/32; 345/161

(56) References Cited

U.S. PATENT DOCUMENTS 5,307,013 A * 4/1994 Santos et al. ............. 74/475 X
6,205,874 B1 * 3/2001 Kupper et al. ................ 74/335

FOREIGN PATENT DOCUMENTS

| DE | 694 08 356 T2 | 10/1994 | |
|----|----|----|----|
| EP | 0 075 693 | 4/1983 | |
| EP | 0 620 385 B1 | 10/1994 | |
| EP | 0 620 385 A1 | 10/1994 | |
| EP | 0 936 385 A2 | 8/1999 | |
| JP | 406280993 | * 10/1994 | .................. 74/335 |

* cited by examiner

Primary Examiner—Roger Pang
(74) Attorney, Agent, or Firm—McGlew and Tuttle, P.C.

(57) ABSTRACT

A shifting device is provided for shifting between different operating states of a motor vehicle transmission, with a gearshift lever (1), which is mounted movably in a bracket and can be moved in a first direction between two shift gates (A, B). The gearshift lever (1) can also be moved in a second direction along a first of the said two shift gates (A) into three said shift positions (X, Y, Z). A signal transmitter is provided for sending a transmitter signal (5), and three said sensors (2, 3, 4) are arranged at spaced locations from the signal transmitter and in the form of a triangle for detecting the transmitter signal (5). The sensors (2, 3, 4) and the signal transmitter can be moved in relation to one another by the gearshift lever (1), and electric signals characterizing the particular shift position (X, Y, Z) are sent by the sensors (2, 3, 4) at least indirectly to an evaluating device by which the transmission can be put into different operating states as a function of the electric signals. The signal transmitter at the site of the sensors (2, 3, 4), sweeps an area that is larger than or equal to the area of a rectangle, in which the triangle can be congruently imaged. One side of the rectangle extends in parallel to the first shift gate (A). All three sensors (2, 3, 4) are in interaction with the transmitter signal in a first of the three shift positions (X).

17 Claims, 2 Drawing Sheets

SHIFTING DEVICE FOR SHIFTING BETWEEN DIFFERENT OPERATING STATES OF A MOTOR VEHICLE TRANSMISSION

FIELD OF THE INVENTION

The present invention pertains to a shifting device for shifting between different operating states of a motor vehicle transmission, with a gear shift lever, which is mounted movably in a bracket and can be moved in a first direction between two shift gates and which can also be moved in a second direction along a first of two shift gates into three shift positions, with a signal transmitter for sending a transmitter signal, and with three sensors arranged at spaced locations from the signal transmitter and in the form of a triangle for detecting the transmitter signal, wherein the sensors and the signal transmitter can be moved in relation to one another by means of the gearshift lever, and electric signals characterizing the particular shift position are sent by the sensors at least indirectly to an evaluator, by which the transmission can be put into different operating states as a function of the electric signals

BACKGROUND OF THE INVENTION

Such shifting devices have been known from the state of the art. A shifting device with a pivotably mounted gearshift lever, which can be shifted between two shift gates, namely, between a main path and an auxiliary path, by a pivoting movement in a first direction, is disclosed in DE 694 08 356 T2 (EP 0 620 385 B1). Furthermore, the gearshift lever can be pivoted into different shift positions in a second direction extending at right angles to the first direction, the different shift positions of the gearshift lever being detected by means of four sensors and four signal transmitters. The four sensors are arranged here on a plate fixed in the housing of the shifting device, and the four signal transmitters are fixed on a movable plate, which is located above the fixed plate and is coupled with the gearshift lever. The sensors are designed as Hall sensors and the signal transmitters as magnets, wherein the Hall sensors send electric signals corresponding to the particular shift position to an electronic module, which actuates the transmission by means of actuators. One of these sensors is arranged such that it can be determined by means of this sensor whether the gearshift lever is shifted into the main path or into the auxiliary path.

SUMMARY AND OBJECTS OF THE INVENTION

Based on this prior art, the basic object of the present invention is to provide a shifting device of the type mentioned in the introduction, whose design and manufacture are simplified.

The shifting device according to the present invention for shifting between different operating states of the motor vehicle transmission has a gearshift lever, which is mounted movably in a bracket and can be moved in a first direction between two shift gates and can be additionally moved into three shift positions in a second direction along a first of the shift gates. The shifting device has a signal transmitter for sending a transmitter signal and at least three sensors arranged at spaced locations from the signal transmitter and in the form of a triangle for detecting the transmitter signal. The sensors and the signal transmitter can be moved in relation to one another by means of the gearshift lever, and the electric signals characterizing the particular shift position are sent by the sensors at least indirectly to an evaluating means, by means of which the transmission can be put into different operating states as a function of the electric signals. The signal transmitter is designed such that at the site of the sensors, the transmitter signal sweeps an area that is larger than or equal to the area of a rectangle, in which the triangle can be congruently imaged, one side of the rectangle extending in parallel to the first shift gate, and all three sensors are in interaction with the transmitter signal in a first of the three shift positions.

The different shift positions of the gearshift lever in the first shift gate can be recognized by the signal transmitter and the sensors arranged in the form of a triangle (triangular arrangement) being able to be moved or displaced by means of the gearshift lever relative to one another. Depending on the shift position, different combinations of the sensors are in interaction with the transmitter signal, so that the shift position particularly assumed can be unambiguously determined on the basis of the electric signals sent by the sensors. Thus, the transmitter signal has at least such a signal intensity over the entire swept area that the sensors can be in interaction with the transmitter signal.

The shifting device according to the present invention has only a single signal transmitter for three sensors, and the number of components is therefore reduced, and the design is thus simplified. Since it is not necessary to position and fasten a plurality of signal transmitters on one plate, the manufacture of the shifting device according to the present invention is also simplified.

If the area swept by the transmitter is larger than the area of the rectangle, the swept area may also deviate from the rectangular shape.

If the signal transmitter is designed such that the area through which the transmitter signal flows also increases with increasing distance from the signal transmitter, the active area of the signal transmitter that sends the transmitter signal may be smaller than the area of the rectangle. However, the active area of the signal transmitter may also be approximately equal to the area of the rectangle, so that the effort needed for dimensioning the active area with respect to the triangular arrangement is reduced.

The sensors may be provided on a printed circuit board fastened to the gearshift lever, and the signal transmitter may be provided on the bracket of the shifting device. However, the sensors are preferably arranged on the bracket and the signal transmitter on the gearshift lever. Since the signal transmitter is usually provided with only a few electric connections or with no electric connections at all, but each sensor has at least two electric connections, the effort needed for the electric wiring along the movable gearshift lever is reduced by this preferred arrangement.

The sensors may be fastened on a flat printed circuit board. However, the movement of the sensors fastened to the gearshift lever and of the signal transmitter fastened to the gearshift lever takes place on a curved path in the case of a pivotably mounted gearshift lever. To ensure that the distance between the sensors and the signal transmitter as viewed from the pivoting mount of the gearshift lever is affected by the pivoting movement of the gearshift lever, the sensors are preferably arranged on a curved printed circuit board, whose curvature corresponds to the curved pivoting path of the gearshift lever. As a result, the interaction between the signal transmitter and the sensors can be improved.

The signal transmitter may be an illumination source or a reflector illuminated by an illumination source, the sensors being designed as optical sensors and the transmitter signal being sent in the form of optical radiation. The signal transmitter and the sensors are not limited to the visible spectrum of the electromagnetic waves, but they may also interact with one another by means of, e.g., infrared rays. A magnet may also be provided as a signal transmitter, in which case the transmitter signal is sent in the form of a magnetic field. The magnet may be designed as an electromagnet, which is supplied with power via electric lines. However, a permanent magnet is preferably provided as a signal transmitter, in which case the sensors are formed by Hall sensors. No electric connections are necessary for operating the signal transmitter in the case of a permanent magnet, so that the effort needed for wiring is, on the whole, reduced.

The three shift positions in the first shift gate can be used to shift the transmission of the motor vehicle up or down by one or more gears without having to leave the first shift gate with the gearshift lever. A front shift position of the three shift positions is intended for upshifting and a rear shift position of the three shift positions is intended for downshifting the gears. The three shift positions are located on a straight line, and the mounting of the gearshift lever is designed such that the middle shift position forms a stable middle position between the front and rear shift positions. The front and rear shift positions are now designed as unstable shift positions, so that the gearshift lever automatically returns into the middle shift position when the gearshift lever is let go or released by the user in a shift position other than the middle shift position. Since the arrangement of the sensors is in relationship with the shift positions of the gearshift lever, the three sensors are preferably arranged in the form of an isosceles triangle, and the side of the triangle enclosed between the equal sides extends in parallel to the first shift gate. It is achieved by this arrangement of the sensors that the same distance is provided between the front and middle shift positions as between the middle and rear shift positions.

If the corner points of the triangle formed by the sensors are projected onto the straight line defined by the second direction in the shifting device according to the present invention, the image points of the corner points generated by the projection form a row of three points arranged at spaced locations from one another on this straight line. It can be recognized with the sensor associated with the middle image point whether the gearshift lever has been moved into the first shift gate, and this sensor is therefore also called the shift gate sensor. The individual shift positions in the first shift gate can be recognized with the sensors associated with the outer image points, and these sensors are therefore also called shift position sensors.

The two shift position sensors would, in principle, be sufficient for detecting the three shift positions in the first shift gate. However, a safety-increasing redundancy is achieved by means of the shift gate sensor provided additionally.

Regardless of the shift position, at least one of the shift position sensors is in interaction with the transmitter signal in the first shift gate, and, furthermore, the electric signal sent by the shift gate sensor carries the information that the gearshift lever has been shifted into the first shift gate. The shift gate sensor may be arranged either facing the second shift gate or facing away from same with respect to the triangle. However, if the shift gate sensor is arranged on the side of the straight line defined by the two shift position sensors, which side faces away from the second shift gate, the shift position sensors or the electric signals sent by them can be deactivated, e.g., by means of the shift gate sensor when the gearshift lever is moved out of the first shift gate, because the shift gate sensor falls out of the area affected by the transmitter signal in this arrangement of the shift gate sensors. The shift gate sensor is therefore preferably arranged on the side of the straight line defined by the two shift position sensors, which side faces away from the second shift gate.

Each of the three shift positions may be the same shift position that is assumed as the first one when the gearshift lever is shifted from the second shift gate into the first shift gate. However, the first shift position is preferably the shift position assumed first when the gearshift lever is shifted from the second shift gate into the first shift gate. According to this embodiment of the present invention, all three sensors come consequently first into interaction with the transmitter signal when the gearshift lever is moved into the first shift gate. According to another preferred embodiment of the present invention, the first shift position now also forms the middle shift position at the same time.

If the gearshift lever is moved in a direction called the forward direction from the middle shift position along the first shift gate, it reaches a second of the three shift positions. If, by contrast, the gearshift lever is moved in the direction opposite the forward direction, which is called the reverse direction, it reaches the third shift position.

In the second shift position, the shift position sensor arranged in the forward direction and the shift gate sensor are in interaction with the transmitter signal, whereas the shift position sensor arranged in the reverse direction is not in interaction with the transmitter signal. The shift position sensor arranged in the reverse direction and the shift gate sensor are in interaction with the transmitter signal in the shift position, whereas the shift position sensor arranged in the forward direction is not in interaction with the transmitter signal.

The shift gate sensor is not necessary for the mere recognition of the first, second or third shifting state, but the shifting device without shift gate sensor could have the following drawback: When the gearshift lever arranged in the first shift position is shifted out of the first shift gate, the two shift position sensors do not usually fall out of the area affected by the transmitter signal simultaneously because of inaccuracies in mounting and component tolerances. However, the electric signals sent by the sensors indicate in this case either the second shift position or the third shift position, which could cause the evaluating means to change the operating state of the transmission, even though the user only wanted to shift the gearshift lever out of the first shift gate and did not intend to change the operating state at all.

In the preferred embodiment of the present invention, when the gearshift lever is shifted out of the first shift gate, the shift gate sensor is the first sensor to drop out of the area affected by the transmitter signal before one or both of the shift position sensors fall out of the area affected by the signal transmitter and the above-mentioned drawback can occur. The change of the shift gate can thus be unambiguously recognized. The electric signals sent by the shift position sensors (shift position signals) are consequently taken into account for setting the operating state of the transmission only when the shift gate sensor is in interaction with the transmitter signal or the electric signal sent by the shift gate sensor (shift gate signal) carries the information that the gearshift lever has been brought into the first shift gate. As a result, the above-described drawback can be eliminated.

All three sensors can be continuously activated during the use of the shifting device according to the present invention, the shift position signals and the shift gate signal being sent to the evaluating means. However, the shift position sensors or the shift position signals are preferably deactivated by the shift gate sensor when the gearshift lever is pivoted out of the first shift gate and they are activated by the shift gate sensor when the gearshift lever is pivoted into the first shift gate. In this case, the shift gate signal is used as a control signal for the shift position sensors or the shift position signals, and it no longer needs to be sent to the evaluating means, so that the electric connection or line provided for this can be eliminated. As a result, the shifting device according to the present invention is made more simple and less expensive.

It is assumed for the following description of the activation and deactivation of the shift position sensors or shift position signals that the signal sent by each of the sensors has a logic H level when the energized sensor is in interaction with the transmitter signal, a logic L level when the energized sensor is not in interaction with the transmitter signal, and a logic L level or a third level at least deviating from the H level when the power supply for the sensor is switched off. The sensor is in the active state when the sensor is supplied with power and in the deactivated state when the sensor is not supplied with power.

The activation and the deactivation of the shift position sensors can be achieved, e.g., by the power supply for the shift position sensors being switched on or switched off by the shift gate sensor. Since both shift position signals have a logic L level or a third level in the deactivated state of the shift position sensors, the evaluating means can recognize solely on the basis of the shift position signals that the gearshift lever is not set into the first shift gate. If a three-state logic is used, the third level may also correspond to the high-resistance state.

The activation and the deactivation of the shift position signals can be carried out by each shift position signal being subjected to a logic AND operation with the shift gate signal. In this case, each shift position signal is sent in the form of a linked signal to the evaluating means. In the deactivated state of the shift position signal, the shift gate signal has a logic L level, as a result of which the linked signal has a logic L level. By contrast, the shift gate signal has a logic H level in the activated state of the shift position signal, so that the logic level of the linked signal always corresponds to the logic level of the shift position signal. During the activation and deactivation of the shift position signals, these signals are sent to the evaluating means indirectly, namely, in the form of linked signals.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
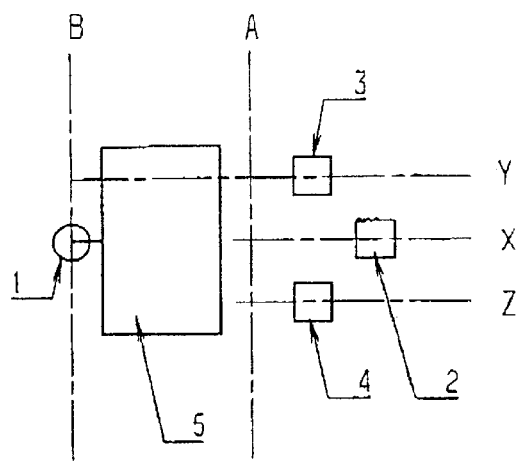
FIG. 1 is a schematic view of an embodiment of the shifting device according to the present invention, in which the gearshift lever is pivoted into the second shift gate.

Referring to the drawings in particular, FIG. 1 shows a schematic view of an embodiment of the shifting device according to the present invention with a pivotably mounted gearshift lever 1 on a bracket 6, which can be pivoted in two shift gates A and B, wherein the gearshift lever 1 is located in the second shift gate B according to FIG. 1. In the first shift gate A, the gearshift lever 1 can be pivoted into three shift positions X, Y and Z, and three Hall sensors 2, 3 and 4 associated with the first shift gate are arranged in the form of an isosceles triangle. The base connecting the two equal sides of the triangle extends in parallel to the first shift gate A, and the two Hall sensors 3 and 4 limiting the base will hereinafter be called shift position sensors 3 and 4. The Hall sensor 2, which is located opposite the base and will hereinafter be called the shift gate sensor, is arranged on the side facing away from the second shift gate B. A signal transmitter 7 such as a permanent magnet, whose magnetic field 5 can be in interaction with the Hall sensors 2, 3 and 4, is arranged at the gearshift lever 1. The pole of the permanent magnet facing the sensors 2, 3 and 4 is rectangular and has such a large area that the triangular sensor arrangement 2, 3 and 4 can be completely covered by its magnetic field 5.

Figure 2:
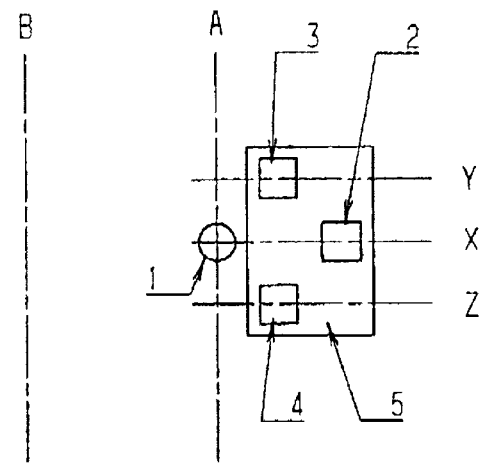
FIG. 2 is a schematic view of the embodiment, in which the gearshift lever is pivoted into a first shift position provided in the first shift gate.

As is apparent from FIG. 2, the magnetic field 5 of the rectangular permanent magnet covers all three Hall sensors 2, 3 and 4 when the gearshift lever 1 is pivoted into a first of the three shift positions, X, which will hereinafter be called the neutral position. Consequently, all three Hall sensors are in interaction with the magnetic field 5 of the permanent magnet in the first shift position. in the direction of the shift gate A, a second of the shift positions, Y, called the upward position, is located in front of the neutral position X of the gearshift lever, and the third shift position, Z, called the downward position, is located behind the neutral position X of the gearshift lever, and one of the shift position sensors 3 and 4 is associated with the upward position Y and the downward position Z.

Figure 3:
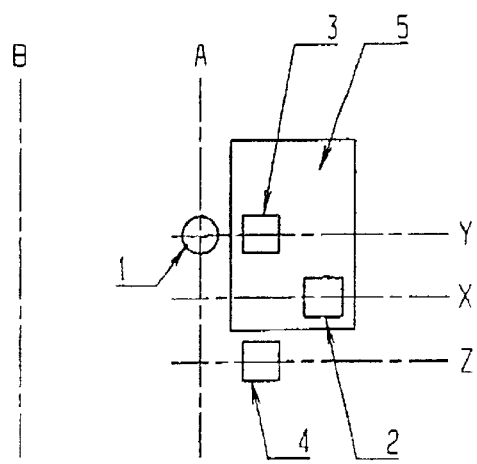
FIG. 3 is a schematic view of the embodiment, in which the gearshift lever is pivoted into a second shift position.

According to FIG. 3, the gearshift lever 1 is pivoted into the upward position Y, so that the magnetic field 5 of the permanent magnet covers the shift position sensor 3 associated with the upward position Y and the shift gate sensor 2, and the shift position sensor 4 associated with the downward position Z is not covered by the magnetic field 5 of the permanent magnet. Consequently the shift gate sensor 2 and the shift position sensor 3 are in interaction with the magnetic field 5 of the permanent magnet in the second shift position.

Figure 4:
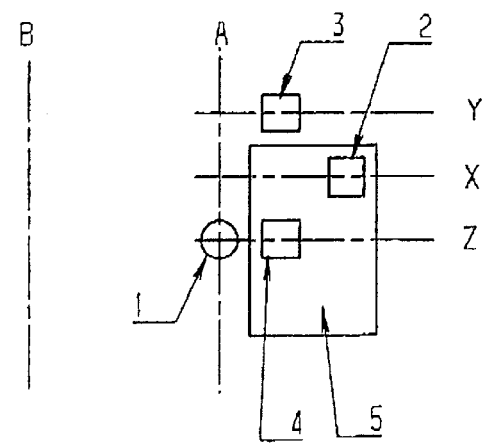
FIG. 4 is a schematic view of the embodiment, in which the gearshift lever is pivoted into a third shift position.
Figure 5:
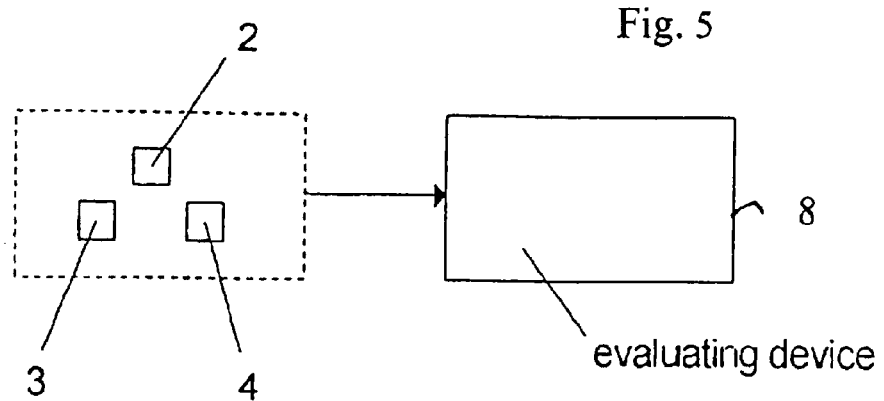
FIG. 5 is a schematic view of the sensors and evaluating device.
Figure 6:
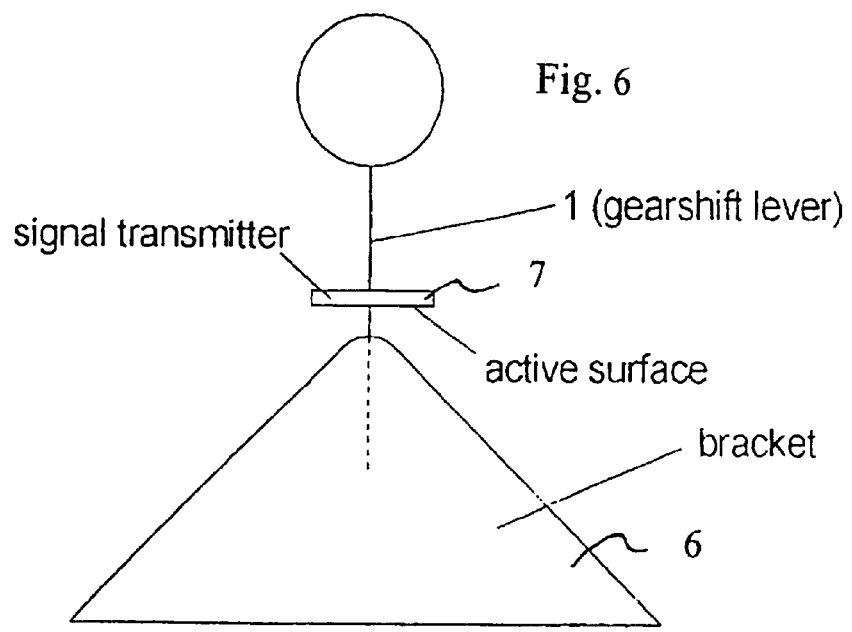
FIG. 6 is a schematic side view of the gearshift lever, bracket and signal transmitter.
Figure 7:
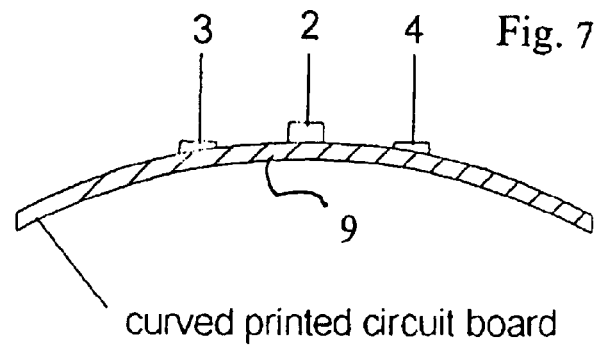
FIG. 7 is a cross-sectional side view of the curved printed circuit board.

If, by contrast, the gearshift lever 1 is pivoted into the downward position Z, as is apparent from FIG. 4, the magnetic field 5 of the permanent magnet covers the shift position sensor 4 associated with the downward position Z and the shift gate sensor 2, and the shift position sensor 3 associated with the upward position Y is not covered by the magnetic field 5 of the permanent magnet. Consequently, the shift gate sensor 2 and the shift position sensor 4 are in interaction with the magnetic field 5 of the permanent magnet in the third shift position.

As is apparent from the figures, the magnetic field 5 is somewhat larger than the minimal area of a rectangle, into which the triangle formed by the sensors 2, 3 and 4 is congruently imaged, and one side of this rectangle extends in parallel to the first shift gate A. This is due to the fact that according to this embodiment, the area of the pole of the permanent magnet facing the sensors is approximately equal to the area of this rectangle, and the area swept by the magnetic field 5 exceeds the area of the pole at the site of the sensors because of the distance between the sensors 2, 3 and 4 and the permanent magnet. It appears clearly from this that the area of the pole of the permanent magnet facing the sensors may also be smaller than the area of this rectangle if the magnetic field sweeps at least the area of this rectangle at the site of the sensors.

The Hall sensors 2, 3 and 4 are connected and designed such that each of the Hall sensors 2, 3 and 4 always sends an electric signal with a logic H level whenever this Hall sensor is covered by the magnetic field 5 of the permanent magnet or is in interaction with the magnetic field 5, and that each of the Hall sensors 2, 3 and 4 always sends an electric signal with a logic L level whenever this Hall sensor is not covered by the magnetic field 5 of the permanent magnet or is not in interaction with the magnetic field 5. The electric signals sent by the shift position sensors 3 and 4 (shift position signals) are taken into account by the evaluating unit 8, concerning a change in the operating state of the transmission only when the signal sent by the shift gate sensor 2 (shift gate signal) has a logic H level.

To ensure that the distance between the sensors 2, 3, 4 and the signal transmitter 7 as viewed from the pivoting bracket 6 of the gearshift lever 1 is affected by the pivoting movement of the gearshift lever 1, the sensors 2, 3, 4 are preferably arranged on a curved printed circuit board 10, whose curvature corresponds to the curved pivoting path of the gearshift lever 1.

Each of the shift position signals is subjected to a logic AND operation with the shift gate signal. The logic states of the shift position signals are passed on by the AND gates necessary for this linkage in the form of the linked signals only when the shift gate signal has a logic H level.

According to the embodiment, the two outputs of the AND gate are connected to the evaluating means, as a result of which the signals that are sent by the sensors and characterize the particular shift position are sent indirectly to the evaluating means.

While specific embodiments of the invention have been shown and described in detail to illustrate the application of the invention, it will be understood that the invention may be embodied otherwise without departing from such principles.

What is claimed is:

1. A shifting device for shifting between different operating states of a motor vehicle transmission, comprising:
   a gearshift lever mounted movably in a bracket and movable in a first direction between two shift gates and which can also be moved in a second direction along a first of said two shift gates into three shift positions;
   a signal transmitter comprising a contiguous active area for sending a transmitter signal;
   three sensors arranged at spaced locations from said signal transmitter and in the form of a triangle for detecting the transmitter signals;
   an evaluating device, said three sensors and said signal transmitter being movable in relation to one another by said gearshift lever and electric signals characterizing particular shift positions being sent by said three sensors at least indirectly to said evaluating device, putting the transmission into different operating states as a function of the electric signals, said active area of said signal transmitter having an extent at the site of said three sensors to flow through a rectangular area that is larger than or equal to the area of a rectangle in which a triangle of said three sensors can be congruently imaged, one side of said rectangle extending in parallel to said first shift gate, and all of said three sensors being in interaction with said transmitter signal in a first of said three shift positions.

2. A shifting device in accordance with claim 1, wherein an active area of said signal transmitter sending a transmitter signal is smaller than or equal to an area of said rectangle.

3. A shifting device in accordance with claim 1, wherein said sensors are arranged on said bracket in a fixed manner and said signal transmitter is fastened to said gearshift lever.

4. A shifting device in accordance with claim 3, wherein said gearshift lever is mounted pivotably and said three sensors are arranged on a curved printed circuit board.

5. A shifting device in accordance with claim 1, wherein said signal transmitter includes a permanent magnet and said three sensors are Hall sensors.

6. A shifting device for shifting between different operating states of a motor vehicle transmission, comprising:
   a gearshift lever mounted movably in a bracket and movable in a first direction between two shift gates and which can also be moved in a second direction along a first of said two shift gates into three shift positions;
   a signal transmitter for sending a transmitter signal;
   three sensors arranged at spaced locations from said signal transmitter and in the form of a triangle for detecting the transmitter signal;
   an evaluating device, said three sensors and said signal transmitter being movable in relation to one another by said gearshift lever and electric signals characterizing particular shift positions being sent by said three sensors at least indirectly to said evaluating device, putting the transmission into different operating states as a function of the electric signals, said signal transmitter at the site of said three sensors sweeping an area that is larger than or equal to the area of a rectangle in which a triangle of said three sensors can be congruently imaged, one side of said rectangle extending in parallel to said first shift gate, and all of said three sensors being in interaction with said transmitter signal in a first of said three shift positions, said three sensors being arranged in a form of an isosceles triangle with a side enclosed by two equal sides extending in parallel to said first shift gate.

7. A shifting device for shifting between different operating states of a motor vehicle transmission, comprising:
   a gearshift lever mounted movably in a bracket and movable in a first direction between two shift gates and which can also be moved in a second direction along a first of said two shift gates into three shift positions;
   a signal transmitter for sending a transmitter signal;
   three sensors arranged at spaced locations from said signal transmitter and in the form of a triangle for detecting the transmitter signal;
   an evaluating device, said three sensors and said signal transmitter being movable in relation to one another by said gearshift lever and electric signals characterizing particular shift positions being sent by said three sensors at least indirectly to said evaluating device, putting the transmission into different operating states as a function of the electric signals, said signal transmitter at the site of said three sensors sweeping an area that is larger than or equal to the area of a rectangle in which a triangle of said three sensors can be congruently imaged, one side of said rectangle extending in parallel to said first shift gate, and all of said three sensors being in interaction with said transmitter signal in a first of said three shift positions, an image of one of said three sensors is in a middle of three images of said three sensors when said three images of said three sensors are projected onto a straight line defined by said second direction, said middle image being used as a shift gate sensor, and images from the other two sensors are used as shift position sensors, wherein said shift gate sensor is arranged on a side of a straight line defined by said two shift position sensors facing away from said second shift gate.

8. A shifting device in accordance with claim 7, wherein a first shift position is a shift position that is assumed by said gearshift lever first when said gearshift lever is being moved out of said second shift gate into said first shift gate.

9. A shifting device in accordance with claim 8, wherein said shift position sensors or the electric signals sent by same are deactivated by said shift gate sensor when the gearshift lever is being moved out of said first shift gate, and it is activated by said shift gate sensor when said gearshift lever is being moved into said first shift gate.

10. A shifting device in accordance with claim 9, wherein each of said electric signals sent by said shift position sensors are subjected to a logic AND operation with said electric signal sent by said shift gate sensor, wherein a linked signal is sent to said evaluating device.

11. A shifting device for a transmission, the device comprising:
- a gearshift lever;
- a bracket movably supporting said gearshift lever in a first direction between two shift gates and in a second direction along a first of said two shift gates into three shift positions;
- a signal transmitter sending a transmitter signal into a contiguous active area;
- a plurality of sensors each detecting the transmitter signal when said each sensor is in said active area, said plurality of sensors defining an overall sensor area including all of said sensors, said active area and said overall sensor area being shaped and sized to have said overall sensor area fit into said active area, said sensors being arranged spaced from said signal transmitter with said active area of said signal transmitter being movable into, and out of, said overall sensor area by said gearshift lever, each of said sensors generating a shift position signal when a respective said sensor is in said active area;
- an evaluating device receiving said shift position signals from said sensors and shifting the transmission into different operating states as a function of the shift position signals.

12. A device in accordance with claim 11, wherein:
said signal transmitter is arranged on said gearshift lever and said sensors are arranged on said bracket.

13. A device in accordance with claim 11, wherein:
a number of said plurality of sensors is three, said three sensors being arranged in a triangular shape, movement between said sensors and said signal transmitters causing said active area to sweep through a substantially rectangular area that covers said triangular shape.

14. A device in accordance with claim 11, wherein:
said gearshift lever arranges all of said sensors in said active area of said signal transmitter in a first of said three shift positions.

15. A device in accordance with claim 14, wherein:
said gearshift lever moves one of said sensors out of said active area of said signal transmitter in a second of said three shift positions.

16. A device in accordance with claim 14, wherein:
said gearshift lever moves a first of said sensors out of said active area of said signal transmitter in a second of said three shift positions;
said gearshift lever moves a second of said sensors out of said active area of said signal transmitter in a third of said three shift positions;
said gearshift lever moves all of said sensors out of said active area of said signal transmitter when said gearshift lever moves from said first shift gate to said second shift gate.

17. A device in accordance with claim 16, wherein:
said gearshift lever moves a third of said sensors out of said active area of said signal transmitter before said first and second sensors are moved out of said active area when said gearshift lever moves from said first shift gate to said second shift gate.

* * * * *